United States Patent
Etling

(10) Patent No.: US 8,052,089 B2
(45) Date of Patent: Nov. 8, 2011

(54) ANTI-ICING APPARATUS FOR HONEYCOMB STRUCTURES

(75) Inventor: Keith A. Etling, Shiloh, IL (US)

(73) Assignee: The Boeing Company, Chicago, IL (US)

(*) Notice: Subject to any disclaimer, the term of this patent is extended or adjusted under 35 U.S.C. 154(b) by 472 days.

(21) Appl. No.: 12/263,684

(22) Filed: Nov. 3, 2008

(65) Prior Publication Data

US 2010/0108814 A1    May 6, 2010

(51) Int. Cl.
*B64D 15/02* (2006.01)

(52) U.S. Cl. .................................. 244/134 B

(58) Field of Classification Search ............. 244/134 B, 244/134 R, 134 C
See application file for complete search history.

(56) References Cited

U.S. PATENT DOCUMENTS

| | | | |
|---|---|---|---|
| 2,393,792 A * | 1/1946 | McCollum ............... | 126/110 R |
| 2,645,435 A * | 7/1953 | Pouit ....................... | 244/15 |
| 3,933,327 A * | 1/1976 | Cook et al. .............. | 244/134 B |
| 4,099,691 A * | 7/1978 | Swanson et al. ......... | 244/207 |
| 4,508,295 A * | 4/1985 | Cattaneo et al. ......... | 244/134 A |
| 4,752,049 A * | 6/1988 | Cole ........................ | 244/134 B |
| 5,807,454 A * | 9/1998 | Kawabe et al. .......... | 156/214 |
| 5,841,079 A | 11/1998 | Parente | |
| 6,371,411 B1 | 4/2002 | Breer et al. | |
| 6,467,730 B2 * | 10/2002 | Laugt ...................... | 244/134 B |
| 6,688,558 B2 * | 2/2004 | Breer et al. .............. | 244/134 R |
| 6,698,691 B2 * | 3/2004 | Porte ........................ | 244/134 B |
| 7,055,304 B2 * | 6/2006 | Courtot et al. ........... | 60/39.093 |
| 7,131,612 B2 * | 11/2006 | Baptist et al. ............ | 244/134 R |
| 7,581,378 B2 * | 9/2009 | Brand et al. ............. | 60/39.093 |

FOREIGN PATENT DOCUMENTS

EP    1103462 B1    6/2004

* cited by examiner

*Primary Examiner* — Richard Price, Jr.
(74) *Attorney, Agent, or Firm* — Yee & Associates, P.C.

(57) ABSTRACT

An apparatus comprises a structure having a leading edge, a skin covering the structure, a tip, and a channel. The tip is located at the leading edge, wherein the tip has a number of openings. The channel extends through the structure to the tip, wherein the channel is in communication with the number of openings in the tip.

19 Claims, 8 Drawing Sheets

ANTI-ICING APPARATUS FOR HONEYCOMB STRUCTURES

BACKGROUND INFORMATION

1. Field

The present disclosure relates generally to aircraft and, in particular, to manufacturing aircraft. Still more particularly, the present disclosure relates to a method and apparatus for an anti-icing system.

2. Background

In designing an aircraft, a number of different designs may be considered. These designs include aerodynamic design, propulsion design, and structural design. Aerodynamic design may define the external geometry and general aerodynamic configuration of the aircraft. Propulsion design may involve selecting and/or designing an engine for the aircraft. Structural design may involve designing structures to implement the aerodynamic and propulsion design.

In designing aircraft, it is often desirable to have as little weight as possible for components used in the structure of an aircraft that meet structural design requirements. For example, aircraft are being designed and manufactured with greater and greater percentages of composite materials. Composite materials are used in an aircraft to decrease the weight of the aircraft. Another design feature that is used in aircraft involves using honeycomb structures. A honeycomb structure may be used in various aircraft parts such as, for example, the wings of an aircraft. The decreased weight improves performance features such as, for example, payload capacities and fuel efficiencies.

Although honeycomb structures are extremely lightweight for manufacturing aircraft structures, some challenges may be present for integrating anti-icing systems with these types of structures. For example, with the preferred and/or desired orientation of the honeycomb for maximum structural efficiency, systems are unable to conduct heat through these structures to the leading edge of an airfoil to melt and/or prevent ice formation.

Some currently used solutions involve bonding an expanding boot to the exterior leading edge of the airfoil. This expanding boot may break off ice when inflated. Another solution may involve delivering antifreeze through the pores of the skin of the airfoil.

Although these types of solutions may remove and/or prevent icing, a number of issues are present with these solutions. For example, boots are heavy and require an air source to deliver pressurized air to the boot. These boots may also be easily damaged, resulting in increased maintenance and cost. Antifreeze systems that deliver antifreeze through the skin of the wing increases weight. Further, this type of solution also requires continuous maintenance and may require maintenance operations to remove antifreeze from the skin of the wing after flight. Further, antifreeze also may provide environmental concerns for antifreeze that may drip off of a wing.

Therefore, it would be advantageous to have a method and apparatus to remove and/or prevent ice from forming on a wing that overcomes the issues described above.

SUMMARY

In one advantageous embodiment, an apparatus comprises a structure having a leading edge, a skin covering the structure, a tip, and a channel. The tip is located at the leading edge, wherein the tip has a number of openings. The channel extends through the structure to the tip, wherein the channel is in communication with the number of openings in the tip.

In another advantageous embodiment, an anti-icing system for an aircraft comprises a honeycomb structure, a skin covering the honeycomb structure, a tip, a channel, and a plenum. The honeycomb structure has a leading edge for a wing of the aircraft. The tip is located at the leading edge, wherein the tip has a number of openings. The channel has a first end and a second end and extends through the honeycomb structure. The first end connects to the tip and is in communication with the number of openings in the tip. The plenum is connected to the second end of the channel and is capable of distributing air received at the plenum along a width of the channel.

In yet another advantageous embodiment, a method is present for anti-icing. Air is heated to form heated air. The heated air is sent from a heat source into a channel in a wing having a honeycomb structure and a skin covering the honeycomb structure to a tip located at a leading edge. The tip has a number of openings capable of allowing the heated air to flow through the number of openings.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
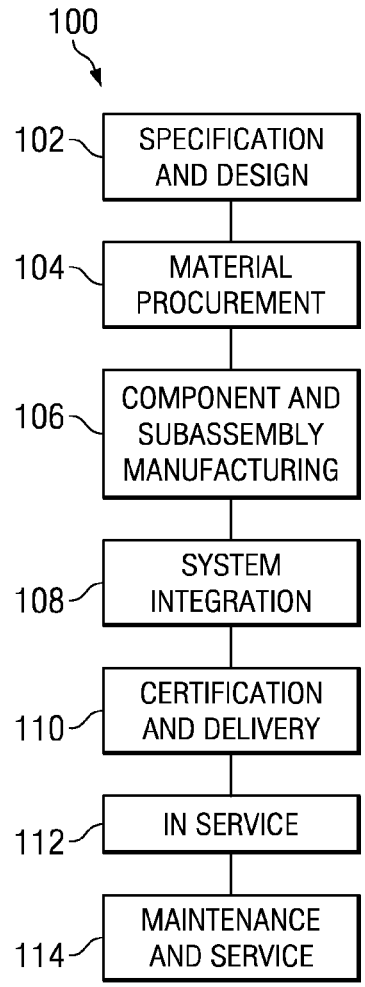
FIG. 1 is a diagram illustrating an aircraft manufacturing and service method in accordance with an advantageous embodiment.
Figure 2:
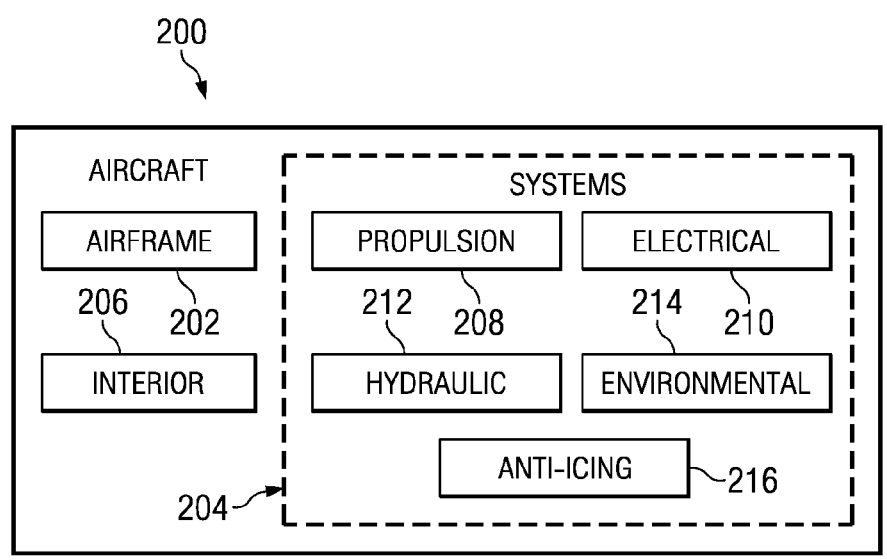
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and anti-icing system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments provide a method and apparatus for an anti-icing system. An apparatus may have a honeycomb structure having a leading edge. A skin covers the honeycomb structure. A tip is located at the leading edge in which the tip has a number of openings. As used herein, a number of items refers to one or more items. For example, a number of openings is one or more openings. A channel extends through the honeycomb structure to the tip. The channel is in communication with the number of openings in the tip.

The channel may allow for a flow of heated air to move to the leading edge of the honeycomb structure and out the number of openings to melt and/or prevent ice formation.

Figure 3:
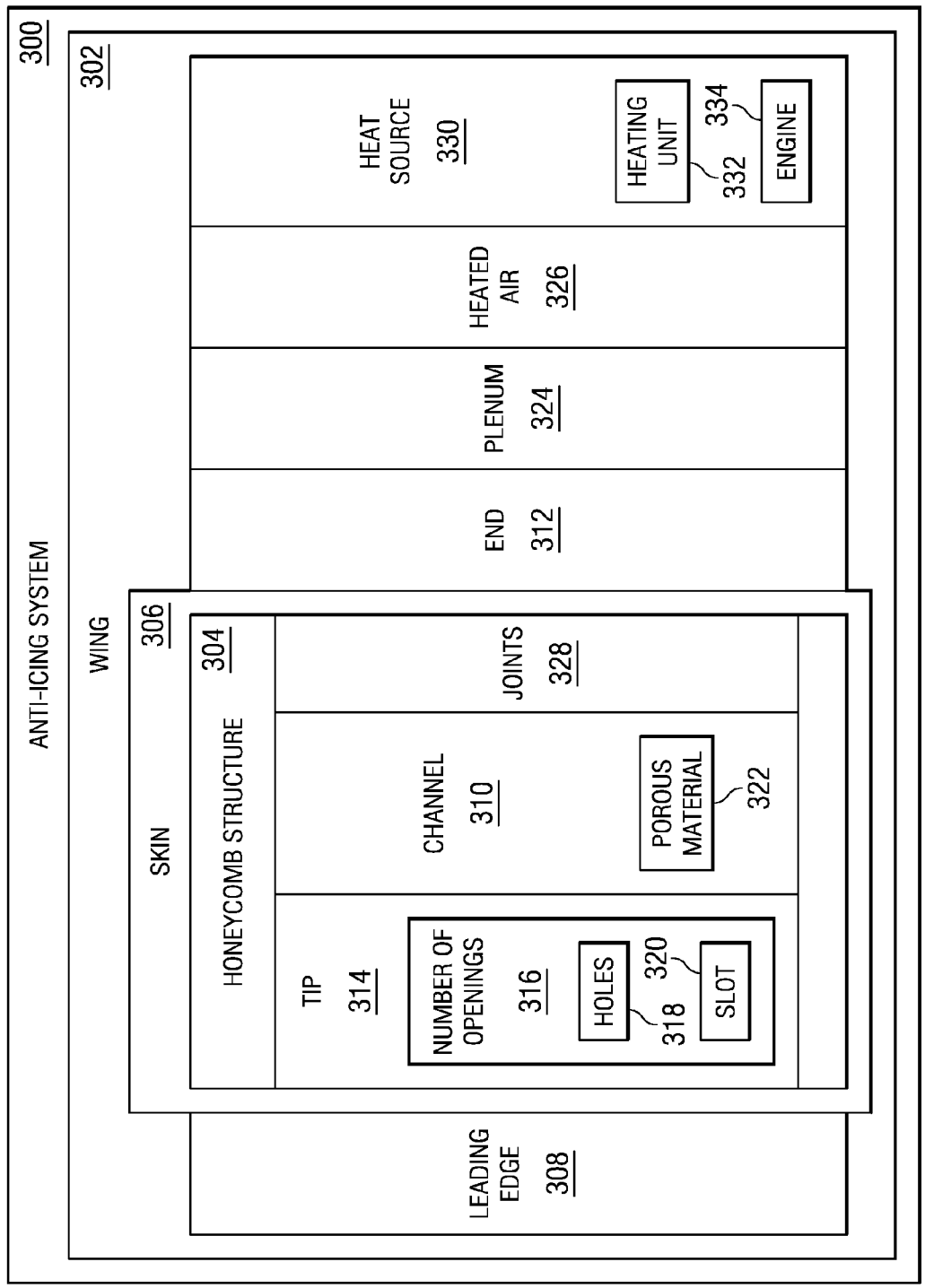
FIG. 3 is a diagram illustrating an anti-icing system in accordance with an advantageous embodiment.

With reference now to FIG. 3, a diagram illustrating an anti-icing system is depicted in accordance with an advantageous embodiment. Anti-icing system 300 is an example of anti-icing system 216 in aircraft 200 in FIG. 2. In this example, anti-icing system 300 may be implemented in wing 302. Wing 302 may have honeycomb structure 304, which may be covered by skin 306. Honeycomb structure 304 may have leading edge 308.

In these examples, skin 306 may take various forms. For example, skin 306 may be aluminum and/or a composite material.

In these illustrative examples, honeycomb structure 304 may be manufactured from various materials. For example, without limitation, honeycomb structure 304 may be comprised of metal, flame-resistant meta-aramid material, composite material, or other suitable materials. For example, if honeycomb structure 304 is made of metal, aluminum may be used. With a flame-resistant meta-aramid material, Nomex® paper may be used. Nomex is a registered trademark of E.I. DuPont DeNemours and Company. This portion of wing 302 may be a portion on which ice may form during flight.

In these examples, honeycomb structure 304 may contain walls that form cells running vertically in wing 302. The different advantageous embodiments recognize that this type of orientation may prevent air from being pushed through honeycomb structure 304 to leading edge 308.

Channel 310 may be made from various materials. These materials include, for example, metal, composite material, plastic, and other suitable materials. Channel 310 is a structure that may conduct heated air and may extend from end 312 to leading edge 308. Channel 310 may be a structure formed from various materials. Also, channel 310 and walls forming cells within honeycomb structure 304 are substantially perpendicular to each other. Channel 310 may be isolated from honeycomb structure 304 such that heated air does not flow through the cells.

In these illustrative examples, channel 310 may be constructed from a material that is capable of carrying heated air. The heated air may be, for example, at a temperature of approximately 350 degrees.

Channel 310 may be hollow or may contain porous material 322. Porous material 322 may be, for example, foam or some other suitable material that may allow heated air to travel through channel 310.

Tip 314 may be located at leading edge 308. Channel 310 is in communication with tip 314. Tip 314 may be a separate structure attached to channel 310. In other advantageous embodiments, tip 314 may be formed as part of channel 310. Tip 314 has number of openings 316. A number, as used herein, refers to one or more items. For example, a number of openings is one or more openings. In these examples, a number of openings may be, for example, without limitation, holes 318 and/or slot 320.

Tip 314 may be made from various materials. For example, tip 314 may be made from a composite material, aluminum, steel, titanium, or some other suitable material.

Anti-icing system 300 also may include plenum 324 at end 312. Plenum 324 may serve to evenly distribute heated air 326 along the width of channel 310. Further, joints 328 may be located in channel 310 or at the end of channel 310. Joints 328 may provide structural support. In some advantageous embodiments, joints 328 may extend through channel 310, depending on the particular implementation. Joints 328 are vertical joints in these examples. Joints 328 may be, for example, a rib, a spar, or some other suitable joint structure.

Plenum 324 is connected to heat source 330. Heat source 330 generates heated air 326. Heat source 330 may take various forms. For example, heat source 330 may be heating unit 332, engine 334, or some other suitable heat source. Heating unit 332 may be, for example, an auxiliary power unit in an aircraft.

The illustration of anti-icing system 300 in FIG. 3 is not meant to imply physical or architectural limitations to the manner in which different advantageous embodiments may be implemented. Some advantageous embodiments may include components in addition to, or in place of, the ones illustrated. Other advantageous embodiments may omit some of the components illustrated in FIG. 3. For example, in some advantageous embodiments, plenum 324 may be unnecessary.

Figure 4:
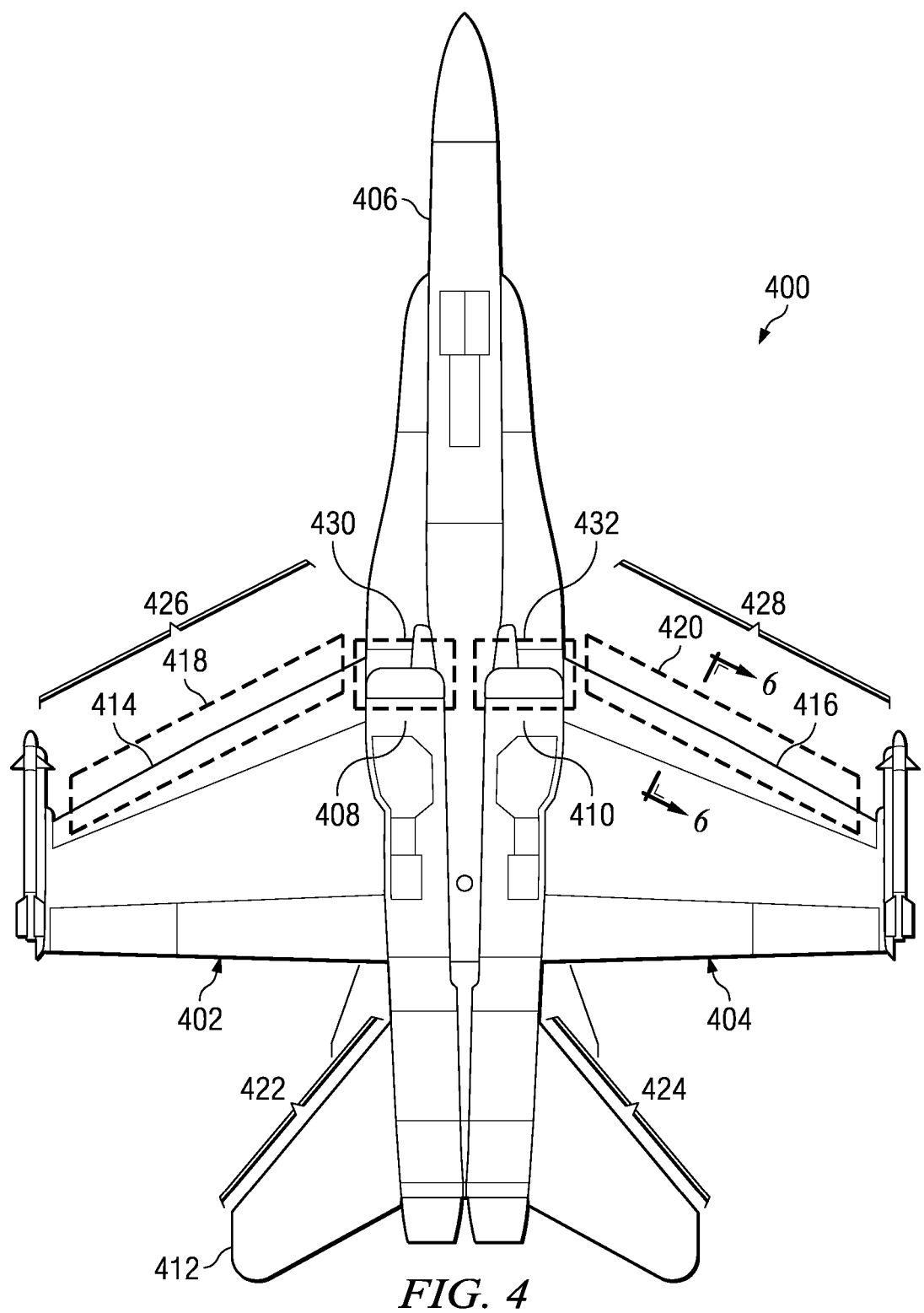
FIG. 4 is a bottom view diagram of an aircraft in accordance with an advantageous embodiment.
Figure 5:
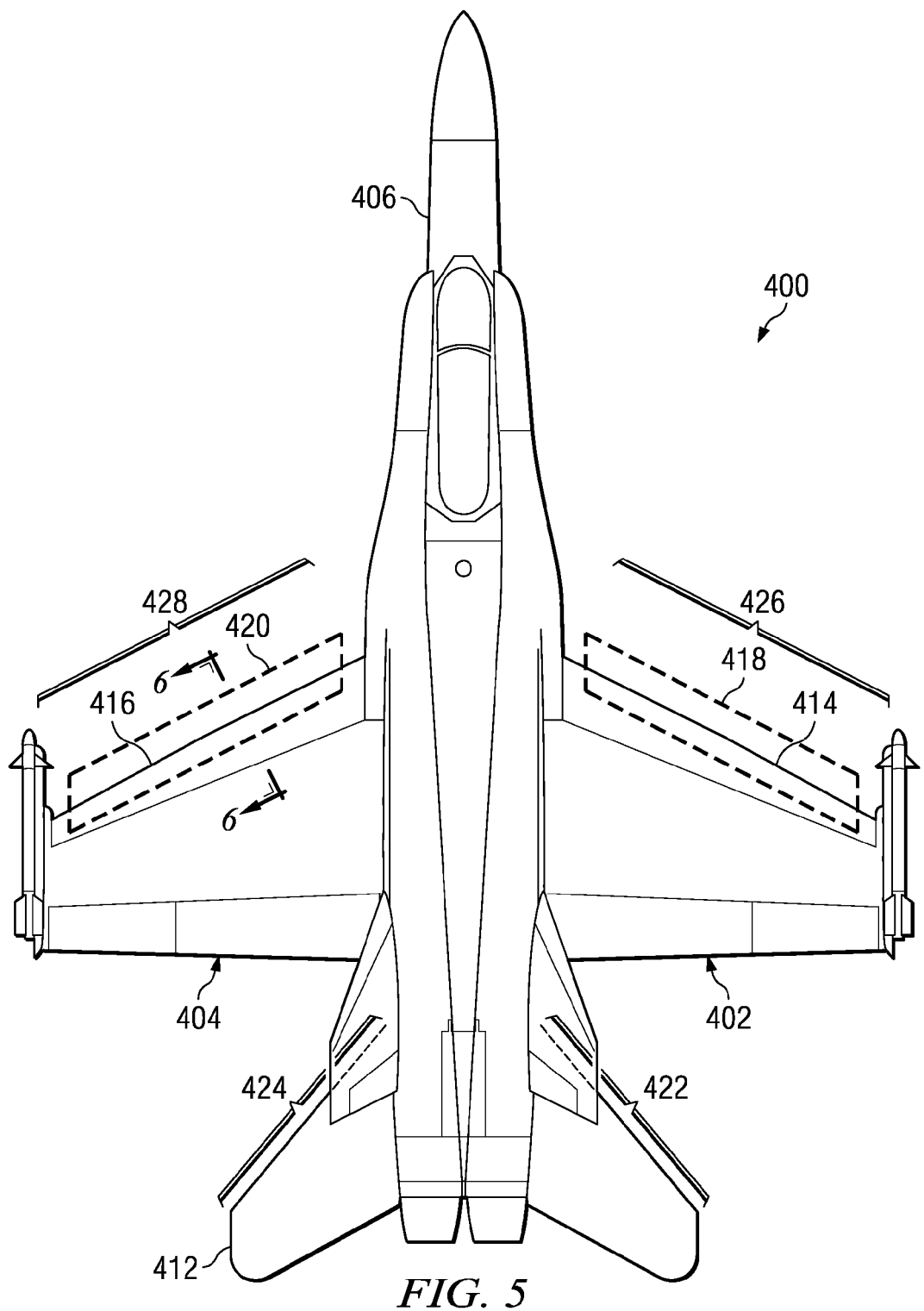
FIG. 5 is a top view diagram of an aircraft in accordance with an advantageous embodiment.

With reference now to FIGS. 4 and 5, diagrams of an aircraft are depicted in accordance with an advantageous embodiment. Aircraft 400 is an example of one implementation of aircraft 200 in FIG. 2. Aircraft 400 may implement anti-icing system 300 in FIG. 3.

In this depicted example, aircraft 400 is depicted in a bottom view in FIG. 4 and a top view in FIG. 5. Aircraft 400 has wings 402 and 404 attached to fuselage 406. In this illustrative example, wings 402 and 404 may have width 426 and width 428 and may employ honeycomb structures in portions or all of wings 402 and 404. Aircraft 400 also includes wing-mounted engine 408, wing-mounted engine 410, and tail 412.

Different advantageous embodiments may be implemented in wings 402 and 404 to prevent and/or minimize icing, as well as melt any ice that may form on leading edges 414 and 416 of wings 402 and 404. In these examples, channels for an anti-icing system may be found within sections 418 and 420 of wings 402 and 404 for aircraft 400.

Further, the different advantageous embodiments may be implemented in other components, such as leading edges 422 and 424 on tail 412 and leading edges 430 and 432 on the aerodynamic cowling of engines 408 and 410. Of course, the different advantageous embodiments may be implemented in any honeycomb structure within aircraft 400. For example, the different advantageous embodiments may be applied to other types of structures other than honeycomb structures. With a metal rib substructure, this type of channel may be placed just behind the skin along the leading edge apex rather than splitting all of the different ribs.

Figure 6:
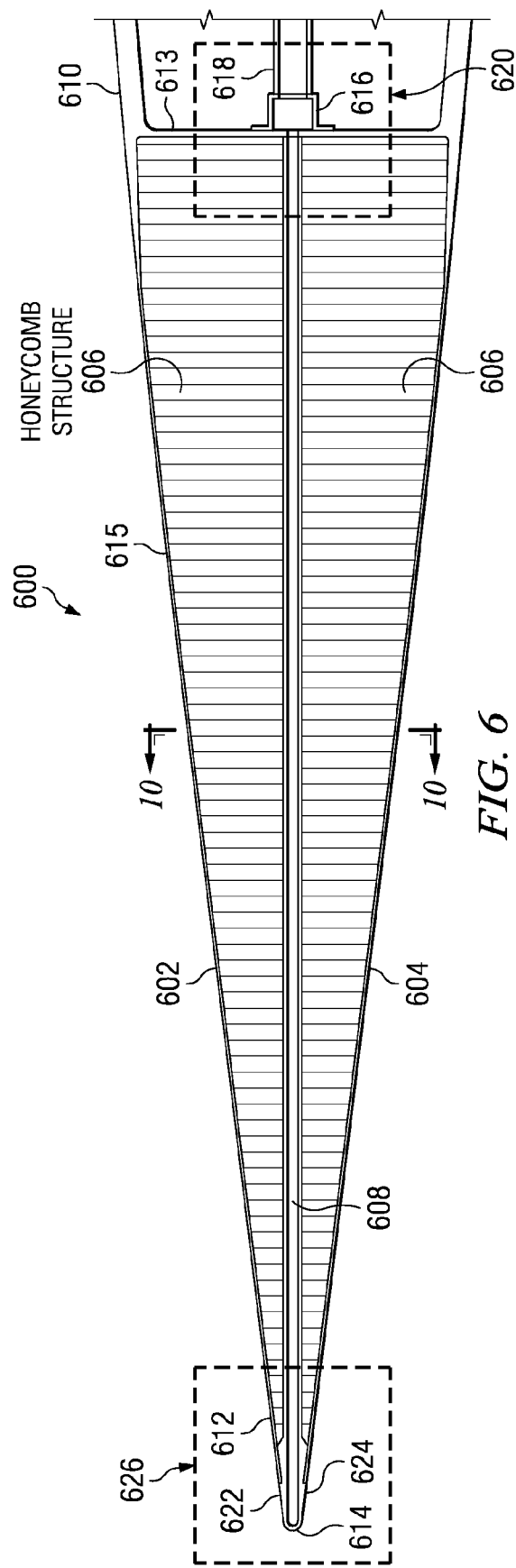
FIG. 6 is a diagram of a portion of a wing in accordance with an advantageous embodiment.

With reference now to FIG. 6, a diagram of a portion of a wing is depicted in accordance with an advantageous embodiment. In this example, wing 600 is an example of a cross section of a portion of wing 404 taken along lines 6-6 in FIGS. 4 and 5. In this example, wing 600 may be comprised of skin 602 and skin 604 which covers honeycomb structure 606.

In this example, channel 608 extends through honeycomb structure 606 from end 610 to end 612. End 612 may be around a leading edge of wing 600, while end 610 may be around a middle or more central portion of wing 600.

Tip 614 is in communication with channel 608 at end 612. Tip 614 may be a separate component attached to channel 608 or may be formed as part of channel 608 depending on the particular implementation. Walls 615 in honeycomb structure 606 form cells in honeycomb structure 606 that extend in a direction substantially normal to channel 608. The direction of walls 615 is substantially normal to a direction of airflow from end 610 to tip 614 of channel 608.

In this example, channel 608 at end 610 is connected to plenum 616. Plenum 616 may evenly distribute air along the width of channel 608 in these examples. This width may be, for example, width 426 and width 428 in FIGS. 4 and 5.

Plenum 616 is connected to air duct 618. Air duct 618 conducts heated air from a heat source to plenum 616. In this manner, heated air entering plenum 616 may be distributed to tip 614 through channel 608 to duct heated air at surfaces 622 and 624 of tip 614. In these examples, section 620 and section 626 are shown in more detail in FIGS. 7 and 8.

Figure 7:
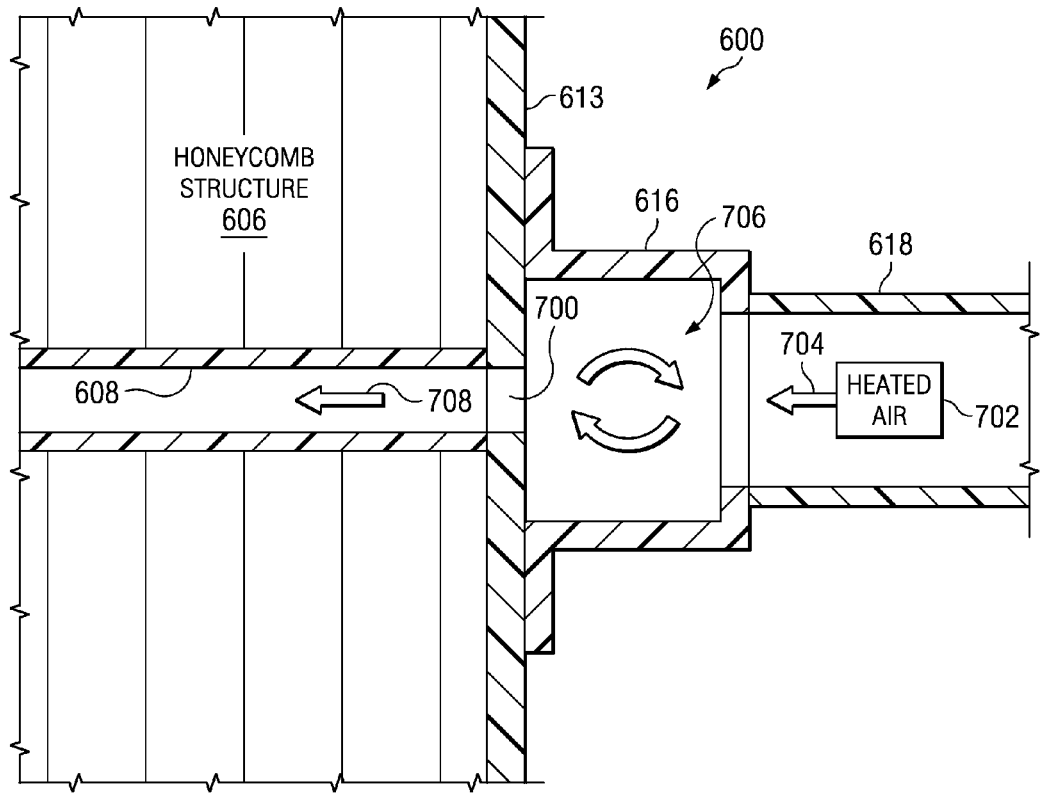
FIG. 7 is a diagram illustrating a distribution of air using a plenum in accordance with an advantageous embodiment.

With reference now to FIG. 7, a diagram illustrating a distribution of air using a plenum is depicted in accordance with an advantageous embodiment. In this example, FIG. 7 shows a more detailed illustration of section 620 in FIG. 6. In this example, channel 608 connects to spar 613. Plenum 616 also connects to spar 613 such that channel 608 is connected to plenum 616 through holes 700.

In these examples, holes 700 may be evenly spaced holes drilled through spar 613. Heated air 702 is moved in the direction of arrow 704 into plenum 616. Plenum 616 circulates heated air 702, as shown by arrows 706. Plenum 616 distributes heated air 702 along the width of channel 608. Heated air 702 is then directed down channel 608 in the direction of arrow 708.

Figure 8:
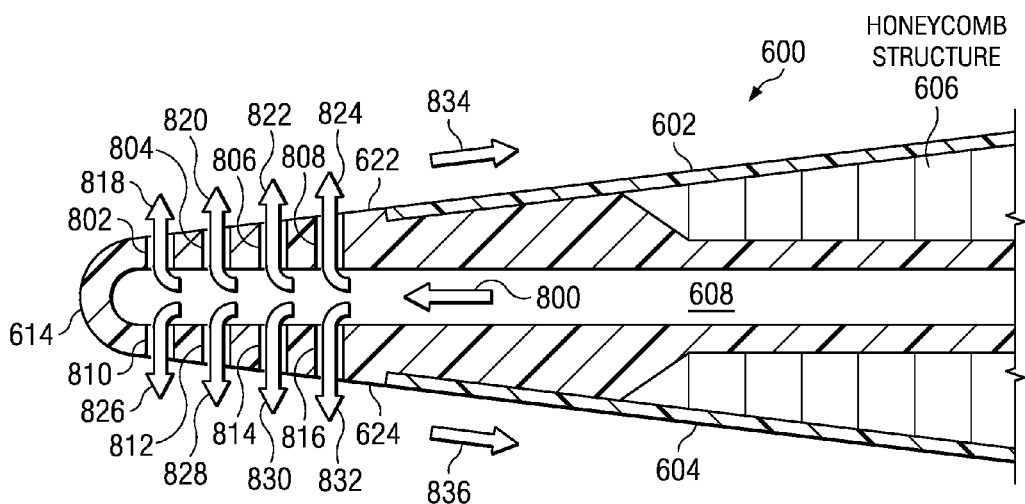
FIG. 8 is a more detailed illustration of a tip of a channel in accordance with an advantageous embodiment.

With reference now to FIG. 8, a more detailed illustration of a tip of a channel is depicted in accordance with an advantageous embodiment. In this example, section 626 in FIG. 6 is shown in more detail. In this illustrative example, heated air is moved within channel 608 along the direction of arrow 800. This air may then be sent through holes 802, 804, 806, and 808 on surface 622 and holes 810, 812, 814, and 816 on surface 624 as shown by arrows 818, 820, 822, 824, 826, 828, 830, and 832, respectively.

The heated air may be distributed over surface 622 and surface 624 in the direction of arrows 834 and 836. In this manner, air may contact skin 602 in a manner that may melt and/or prevent ice from forming. In other words, this air may perform an anti-icing function or operation. In these examples, tip 614 may be around one inch long. The shape and size of channel 608 may vary depending on various factors. In the different advantageous embodiments, the channel may be around 0.25 inches tall. Of course, other sizes may be used depending on the particular implementation.

Figure 9A:
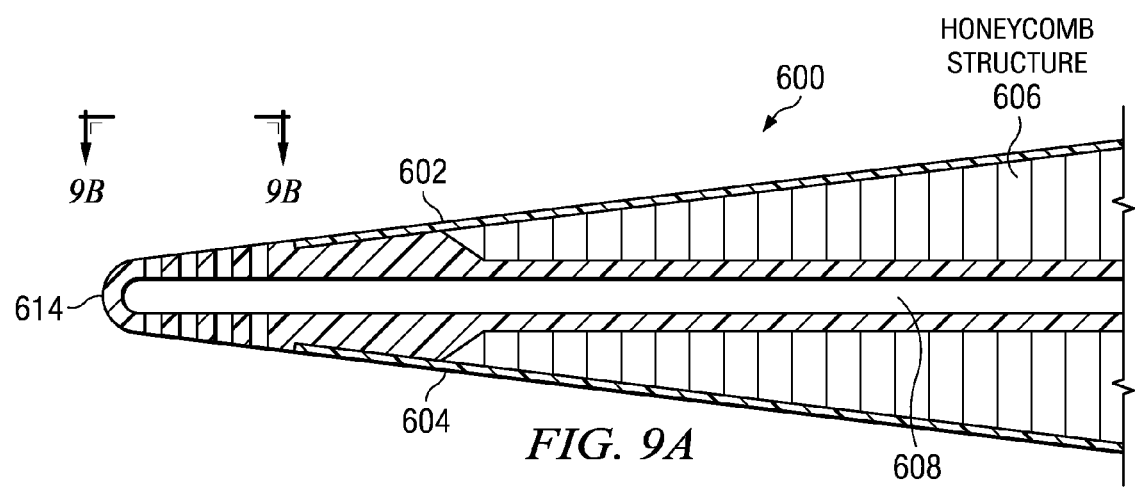
FIGS. 9A and 9B are diagrams of a hole pattern in accordance with an advantageous embodiment.
Figure 9B:
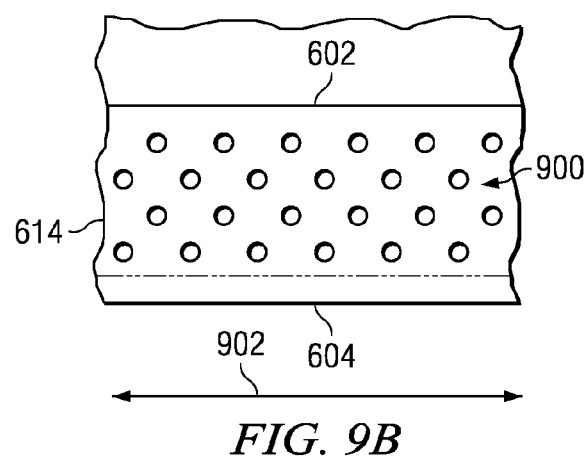

With reference now to FIGS. 9A and 9B, diagrams of a hole pattern is depicted in accordance with an advantageous embodiment. In this example, a hole pattern is illustrated for tip 614. In this example, tip 614 has hole pattern 900. Of course, in other advantageous embodiments, other types of patterns may be used. Also, in other advantageous embodiments, a single slot may run along the width of wing 600 as illustrated by line 902.

Figure 10:
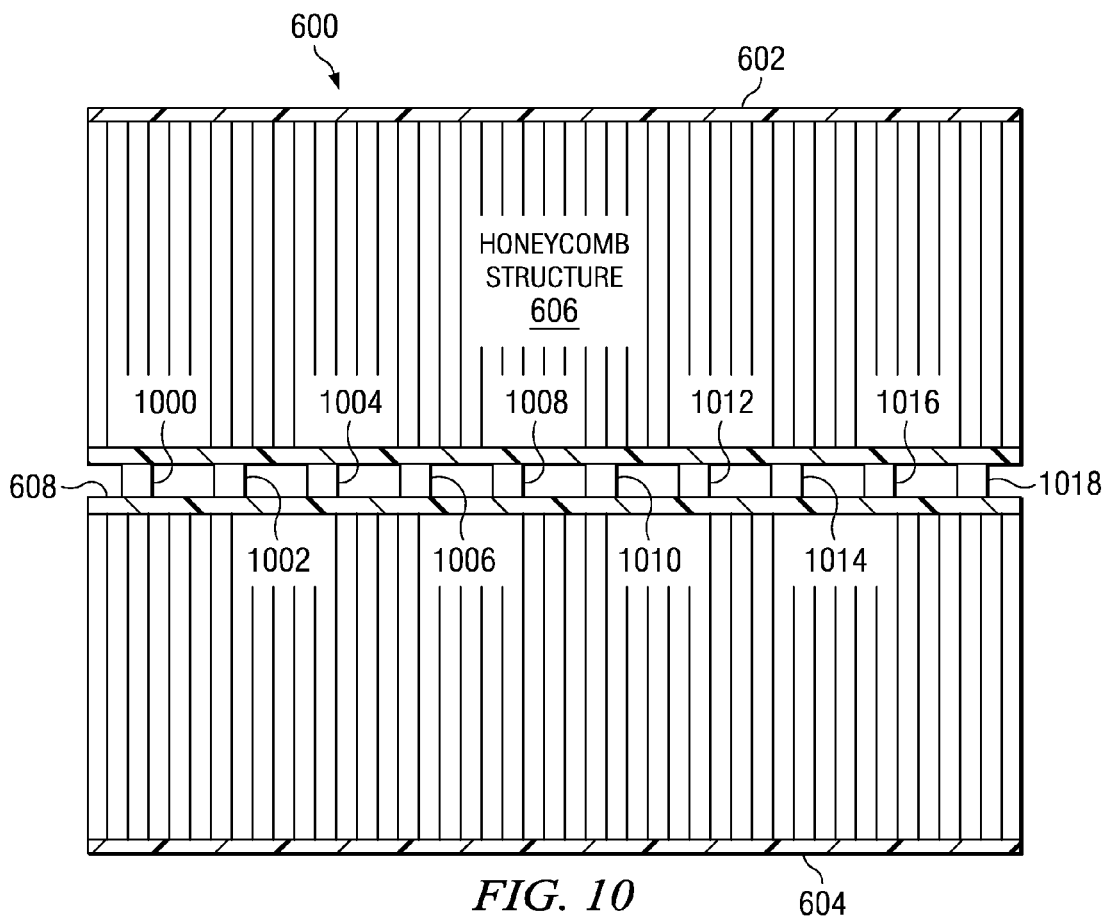
FIG. 10 is a diagram illustrating a cross-sectional view of a wing in accordance with an advantageous embodiment.

With reference now to FIG. 10, a diagram illustrating a cross-sectional view of wing 600 is depicted in accordance with an advantageous embodiment. In this example, wing 600 is shown along lines 10-10 from FIG. 6. In this example, joints 1000, 1002, 1004, 1006, 1008, 1010, 1012, 1014, 1016, and 1018 are seen in this partial cross-sectional view of wing 600. These joints may run through some portion of channel 608 and, in some cases, may extend all the way through channel 608. These joints may provide additional vertical structural support within wing 600.

Thus, the different advantageous embodiments provide a method and apparatus for anti-icing. In the different advantageous embodiments, a honeycomb structure having a leading edge and a skin covering the honeycomb structure is present. A channel extends through the honeycomb structure to a tip where the channel is in communication with a number of openings in the tip.

Figure 11:
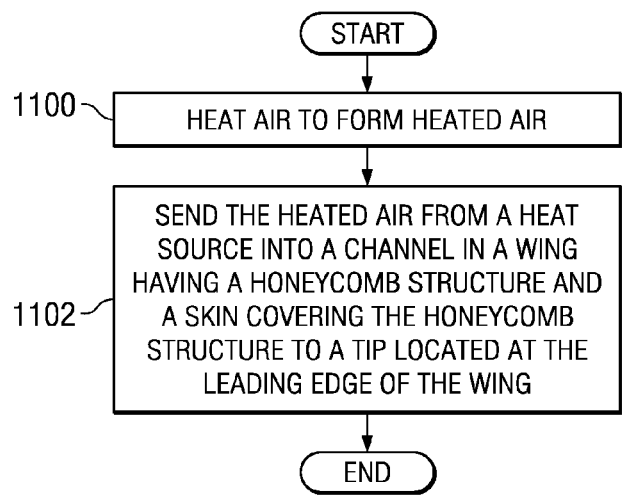
FIG. 11 is a flowchart of a process for performing anti-icing in accordance with an advantageous embodiment.

With reference now to FIG. 11, a flowchart of a process for performing anti-icing is depicted in accordance with an advantageous embodiment. The process illustrated in FIG. 11 may be implemented using an anti-icing system such as, for example, anti-icing system 300 in FIG. 3.

The process begins by heating air to form heated air (operation 1100). The process then sends the heated air from a heat source into a channel in a wing having a honeycomb structure and a skin covering the honeycomb structure to a tip located at the leading edge of the wing (operation 1102), with the process terminating thereafter.

Thus, the different advantageous embodiments provide a method and apparatus for an anti-icing apparatus used with honeycomb structures. In the different advantageous embodiments, an apparatus may include a honeycomb structure having a leading edge. A skin covers the honeycomb structure. A tip may be located at the leading edge, and a channel may extend through the honeycomb structure to the tip. The channel is in communication with a number of openings in the tip.

Heated air may be sent through the channel to the tip and through the holes at the leading edge of the honeycomb structure. The air may then travel over the skin covering the honeycomb structure. In this manner, the heated air may provide anti-icing for the leading edge and/or portions of the structure downstream of the leading edge. This anti-icing may include, for example, melting and/or preventing icing on the skin covering the structure. The air may flow back away from the leading edge over the skin to provide heat.

The different advantageous embodiments avoid the complexity of some currently used systems that may employ antifreeze and/or boots. Further, less maintenance may be required with the anti-icing apparatus in the different advantageous embodiments. Further, the use of liquids that may be messy and/or have environmental concerns also may be avoided.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The different advantageous embodiments may be applied to other types of aircraft and/or structures. For example, the different advantageous embodiments may be applied to helicopter rotor blades and aerodynamic surfaces on a ground vehicle and/or spacecraft. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An anti-icing apparatus comprising:
   a structure having a leading edge;
   a skin covering the structure;
   a tip located at the leading edge, wherein the tip has a number of openings; and
   a channel extending through the structure to the tip, wherein the channel is in communication with the number of openings in the tip,
   wherein the structure is a honeycomb structure, wherein honeycomb walls in the honeycomb structure extend in a direction substantially perpendicular to the channel.

2. The anti-icing apparatus of claim 1 further comprising:
   a heat source, wherein the channel is connected to the heat source.

3. The anti-icing apparatus of claim 2 further comprising:
   a plenum connecting the channel to the heat source.

4. The anti-icing apparatus of claim 2, wherein the heat source is selected from one of a heating unit and an engine.

5. The anti-icing apparatus of claim 1, wherein the channel has a first end and a second end and the first end is connected to the tip and further comprising:
   a plenum connected to the second end of the channel.

6. The anti-icing apparatus of claim 1, wherein the channel comprises a material capable of withstanding a temperature of heated air from a heat source.

7. The anti-icing apparatus of claim 1 further comprising:
   a porous material located in the channel.

8. The anti-icing apparatus of claim 1 further comprising:
   a heat source.

9. The anti-icing apparatus of claim 1, wherein the number of openings is selected from a number of holes and slots.

10. The anti-icing apparatus of claim 1, wherein the channel has a first end and a second end and the first end is connected to the tip and further comprising:
    a number of joints located at the second end of the channel, wherein the number of joints extends from a first side of the channel in contact with the honeycomb structure to a second side of the channel opposite to the first side.

11. The anti-icing apparatus of claim 1, wherein the skin is comprised of a material selected from one of a metal and a composite material.

12. The anti-icing apparatus of claim 1, wherein the structure and the skin form a portion of a leading edge of a wing of an aircraft.

13. An anti-icing system for an aircraft, the anti-icing system comprising:
    a honeycomb structure having an aircraft wing leading edge;
    a skin covering the honeycomb structure;
    a tip located at the leading edge, wherein the tip has a number of openings;
    a channel having a first end and a second end and extending through the honeycomb structure, wherein the first end connects to the tip and is in communication with the number of openings in the tip and wherein the channel extends in a direction substantially perpendicular to a direction of walls forming cells for the honeycomb structure; and
    a plenum connected to the second end of the channel, wherein the plenum distributes air received at the plenum along a width of the channel such that air passes through the channel and out of the number of openings of the tip.

14. The anti-icing system of claim 13 further comprising:
    a heat source selected from one of a heating unit and an aircraft engine.

15. A method for anti-icing, the method comprising:
    heating air to form heated air;
    sending the heated air from a heat source into a channel in a wing having a honeycomb structure and a skin covering the honeycomb structure to a tip located at a leading edge, wherein the channel extends in a direction substantially parallel to walls forming cells for the honeycomb structure and wherein the tip has a number of openings; and
    flowing the heated air through the number of openings.

16. The method of claim 15, wherein the sending step comprises:
    sending the heated air from the heat source into the channel in the wing through a plenum capable of distributing the heated air along a width of the channel in the channel in the wing.

17. The method of claim 15, wherein the heated air prevents ice from forming on or downstream of the leading edge.

18. The method of claim 15, wherein the heated air melts ice located on or downstream of the leading edge.

19. The method of claim 15, wherein the wing is an aircraft wing.

\* \* \* \* \*